(12) United States Patent
Fujimoto et al.

(10) Patent No.: US 9,783,665 B2
(45) Date of Patent: Oct. 10, 2017

(54) POLYOLEFIN-BASED RESIN COMPOSITION

(71) Applicant: SUMITOMO SEIKA CHEMICALS CO., LTD., Kako-gun (JP)

(72) Inventors: Nobutaka Fujimoto, Himeji (JP); Kiyoshi Nishioka, Himeji (JP); Tomoki Kawakita, Himeji (JP); Koh-Hei Nitta, Kanazawa (JP); Makiko Nakahara, Kanazawa (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 0 days.

(21) Appl. No.: 14/778,180

(22) PCT Filed: Apr. 24, 2014

(86) PCT No.: PCT/JP2014/061512
§ 371 (c)(1),
(2) Date: Sep. 18, 2015

(87) PCT Pub. No.: WO2014/175364
PCT Pub. Date: Oct. 30, 2014

(65) Prior Publication Data
US 2016/0280898 A1    Sep. 29, 2016

(30) Foreign Application Priority Data
Apr. 25, 2013 (JP) .................................. 2013-092242

(51) Int. Cl.
*C08L 23/12* (2006.01)
*C08L 69/00* (2006.01)
*C08L 23/10* (2006.01)
*C08G 64/02* (2006.01)

(52) U.S. Cl.
CPC .......... *C08L 23/12* (2013.01); *C08G 64/0208* (2013.01); *C08L 23/10* (2013.01)

(58) Field of Classification Search
USPC ............ 525/64, 133, 146, 148, 67, 186, 187
See application file for complete search history.

(56) References Cited

U.S. PATENT DOCUMENTS 4,064,315 A * 12/1977 Bivans .................. C08F 255/00
428/518

FOREIGN PATENT DOCUMENTS

| CN | 1415661 | A |   | 5/2003 |
| CN | 10155347 | A |   | 10/2009 |
| CN | 101724239 | A |   | 6/2010 |
| CN | 102850747 | A |   | 1/2013 |
| CN | 102850751 | A |   | 1/2013 |
| EP | 0308179 | A2 |   | 3/1989 |
| JP | S61-21143 |   |   | 1/1986 |
| JP | S63-215752 |   |   | 9/1988 |
| JP | H03-269034 |   |   | 11/1991 |
| JP | H04-214750 |   |   | 8/1992 |
| JP | H04-248857 |   |   | 9/1992 |
| JP | 11-225911 |   |   | 8/1999 |
| JP | 2002-146120 | A1 |   | 5/2002 |
| JP | 2002-348417 | A1 |   | 12/2002 |
| JP | 2010138326 |   | * | 6/2010 |
| WO | WO-9925751 |   | * | 5/1990 |
| WO | 2012/051219 | A2 |   | 4/2012 |
| WO | 2013/048754 | A1 |   | 4/2013 |

OTHER PUBLICATIONS

International Search Report for International Application No. PCT/JP2014/061512 dated May 27, 2014.
Office Action dated Jul. 6, 2016 for Corresponding CN patent application No. 201480023311.8; English translation.
Hongge Guo, "Study on the Structure and Property of PP/PC Blends", Chinese Doctoral Dissertations Full-text Database, Engineering Science and Technology I, Aug. 15, 2007, No. 2, pp. 22-28; English translation.
EP 14788640.2: Extended European Search Report dated Oct. 6, 2016.

* cited by examiner

*Primary Examiner* — David Buttner
(74) *Attorney, Agent, or Firm* — Kratz, Quintos & Hanson, LLP

(57) ABSTRACT

This invention provides a polyolefin-based resin composition excellent in mechanical strength and elasticity. The polyolefin-based resin composition comprises a polyolefin-based resin, and, per 100 parts by mass of the polyolefin-based resin, 0.05 to 10 parts by mass of an aliphatic polycarbonate resin and 0.01 to 2 parts by mass of an acid modified polypropylene.

11 Claims, 1 Drawing Sheet

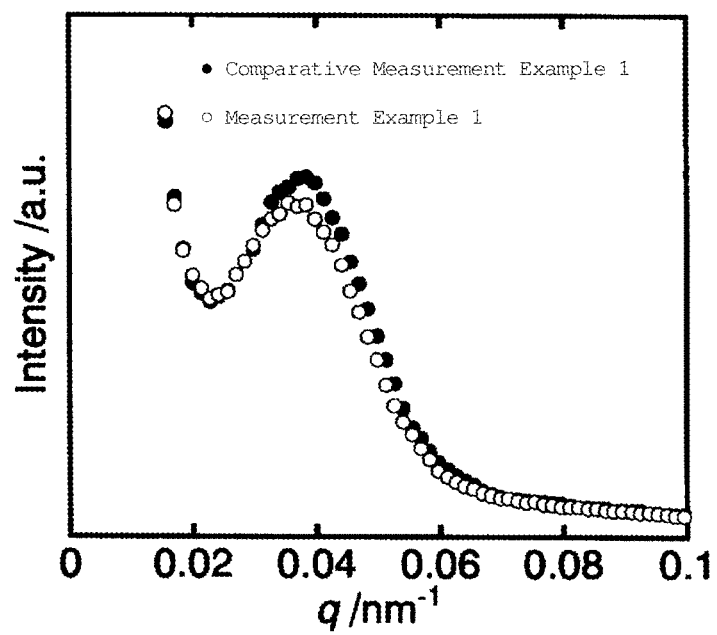

POLYOLEFIN-BASED RESIN COMPOSITION

TECHNICAL FIELD

The present invention relates to a polyolefin-based resin composition, and more specifically relates to a polyolefin-based resin composition that is excellent in mechanical strength and elasticity and a molded article obtained from the composition.

BACKGROUND ART

Polyolefin-based resins, typically polyethylene and polypropylene, have been widely used as general-purpose polymers because they are inexpensive, easy to process, strong, and light, while being produced at low cost. In particular, polypropylene, because of its excellent heat resistance and transparency, and favorable moldability, has been used for a wide range of applications in, for example, automotive parts, electrical and electronic components, industrial materials, furniture, stationery, miscellaneous daily goods, containers, packaging products, toys, leisure goods, and medical products.

The performance of polypropylene is closely associated with its crystalline form, crystallinity, crystalline morphology (size of spherulites), and the like. Thus, attempts have been made to control the molecular structure of polypropylene to thereby control the structures of the crystalline regions and the amorphous regions on the order of nanometers for the purpose of improving heat resistance, and mechanical properties, such as scratch-resistance and rubber elasticity.

Examples of known methods for improving mechanical properties, such as yield stress, necking stress, breaking stress, and breaking strain, without altering the molecular structure of a polymer include a method comprising modifying the processing technique, and a method comprising adding an elastomer, an inorganic filler, or the like to polypropylene to form a composite material. In particular, a high-performance approach using an additive can control a wide range of mechanical properties, and the approach is more economical than the technique for controlling the molecular structure of polypropylene.

Patent Document 1 discloses a composition consisting of polypropylene and a specific propylene-butene-ethylene copolymer, and the use of the composition for industrial shrink films and business-use wrap films.

CITATION LIST

Patent Document

Patent Document 1: JP2002-348417A

SUMMARY OF INVENTION

Technical Problem

Although, as mentioned above, various modifications with respect to the mechanical strength of polypropylene-based resin compositions have been proposed, it has been difficult to improve elasticity, such as breaking strain, while maintaining mechanical strength, such as yield stress, necking stress, and breaking stress. The composition of Patent Document 1 must have a high content of a propylene-butene-ethylene copolymer to secure elasticity, which results in a decrease in the amount of crystalline regions of polypropylene, thus reducing the strength of the composition.

An object of the present invention is to provide a polyolefin-based resin composition excellent in both mechanical strength and elasticity, and a molded article obtained from the composition.

Solution to Problem

The present inventors conducted extensive research to achieve the above object. The inventors then found that a polyolefin-based resin composition comprising an aliphatic polycarbonate resin and an acid modified polypropylene in specific amounts relative to the amount of the polyolefin-based resin is excellent in both mechanical strength and elasticity, to thereby complete the invention. Specifically, the present invention includes, for example, the subject matter presented in the following items.

Item 1

A polyolefin-based resin composition comprising: a polyolefin-based resin, an aliphatic polycarbonate resin, and an acid modified polypropylene, wherein, per 100 parts by mass of the polyolefin-based resin, 0.05 to 10 parts by mass of the aliphatic polycarbonate resin and 0.01 to 2 parts by mass of the acid modified polypropylene are present.

Item 2

The polyolefin-based resin composition according to Item 1, wherein the polyolefin-based resin is polypropylene.

Item 3

The polyolefin-based resin composition according to Item 1 or 2, wherein the aliphatic polycarbonate resin is a polymer obtained by polymerizing carbon dioxide and an alkylene oxide in the presence of a metal catalyst.

Item 4

The polyolefin-based resin composition according to any one of Items 1 to 3, wherein the aliphatic polycarbonate resin is polypropylene carbonate.

Item 5

The polyolefin-based resin composition according to any one of Items 1 to 4, wherein the acid modified polypropylene is maleic acid modified polypropylene or maleic anhydride modified polypropylene.

Item 6

A molded article obtained from the polyolefin-based resin composition according to any one of Items 1 to 5.

Item 7

An elasticity improving agent for a polyolefin-based resin, the elasticity improving agent comprising an aliphatic polycarbonate resin and an acid modified polypropylene.

Item 8

The elasticity improving agent for a polyolefin-based resin according to Item 7, wherein the acid modified polypropylene is present in an amount of 0.01 to 2 parts by mass per 0.05 to 10 parts by mass of the aliphatic polycarbonate resin.

Item 9

An aid for improving the elasticity of a polyolefin-based resin, the aid comprising an aliphatic polycarbonate resin, the aid being for use in combination with an acid modified polypropylene.

Advantageous Effects of Invention

Because the polyolefin-based resin composition according to the present invention comprises a polyolefin-based resin, and also comprises a specific amount of an aliphatic polycarbonate resin and an acid modified polypropylene based on the amount of the polyolefin-based resin, the polyolefin-based resin composition exhibits excellent mechanical strength and elasticity.

BRIEF DESCRIPTION OF DRAWINGS

FIG. 1 shows the measurement results of small-angle X-ray scattering conducted using test specimens of Example 1 and Comparative Example 1.

DESCRIPTION OF EMBODIMENTS

The following describes a polyolefin-based resin composition according to the present invention in detail.

The polyolefin-based resin composition according to the present invention comprises, in addition to a polyolefin-based resin, specific proportions of an aliphatic polycarbonate resin and an acid modified polypropylene.

The polyolefin-based resin usable in the present invention is a polymer comprising monomer units derived from an olefin. Examples include polyethylene-based resins, ethylene/carboxylic acid alkenyl ester copolymer resins, ethylene/unsaturated carboxylic acid alkyl ester copolymer resins, polypropylene-based resins, polybutene-based resins, and poly(4-methyl-1-pentene)-based resins.

Examples of preferable polyethylene-based resins include polyethylene. Polyethylene is not particularly limited, and examples of usable polyethylene include low-density polyethylene, linear low-density polyethylene, medium-density polyethylene, and high-density polyethylene.

Examples of "carboxylic acid alkenyl esters" of ethylene/carboxylic acid alkenyl ester copolymer resins include vinyl acetate, vinyl propionate, vinyl butylate, isopropenyl acetate, and allyl acetate. Of these, vinyl acetate is preferable. Specifically, as an ethylene/carboxylic acid alkenyl ester copolymer resin, an ethylene/vinyl acetate copolymer is particularly preferable.

Examples of "unsaturated carboxylic acid alkyl esters" of ethylene/unsaturated carboxylic acid alkyl ester copolymer resins include methyl acrylate, ethyl acrylate, propyl acrylate, methyl methacrylate, ethyl methacrylate, and propyl methacrylate. Of these, methyl acrylate and methyl methacrylate are preferable. Specifically, as an ethylene/unsaturated carboxylic acid alkyl ester copolymer resin, an ethylene/methyl acrylate copolymer and an ethylene/methyl methacrylate copolymer are particularly preferable.

Preferable examples of polypropylene-based resins include polypropylene and copolymers of propylene with one or more other olefins. Examples of preferable "one or more other olefins" as used herein include ethylene, butene, pentene, hexene, and octane. The "one or more other olefins" for use refers to a single olefin or a combination of two or more olefins (i.e., propylene with a single olefin, or propylene with a combination of two or more other olefins can be made into a copolymer). More specifically, as a polypropylene-based resin, polypropylene, a propylene/ethylene copolymer, a propylene/ethylene/butene copolymer, a propylene/butene copolymer, a propylene/hexene copolymer, a propylene/octene copolymer, and the like are preferable. Propylene and a propylene/ethylene copolymer are particularly more preferable.

Polyolefin-based resins can be used singly or in a combination of two or more. Of polyolefin-based resins, polypropylene-based resins are preferably used from the standpoint of excellent compatibility with aliphatic polycarbonate resins. At least one resin selected from the group consisting of polypropylene and copolymers of propylene with one or more other olefins is more preferably used. Propylene/ethylene copolymers are yet more preferably used.

Examples of methods for producing a polyolefin-based resin include methods comprising radical polymerization of an olefin using an initiator, such as a peroxide, and methods comprising polymerization of an olefin using a gas-phase technique, solution technique, or the like in the presence of a polymerization catalyst. Examples of usable polymerization catalysts include Ziegler-Natta catalysts and metallocene catalysts.

The molecular weight of the above-described polyolefin-based resins is not particularly limited. For example, the weight average molecular weight is preferably within the range of 20,000 to 6,000,000, more preferably 30,000 to 6,000,000, and yet more preferably 100,000 to 5,000,000.

The polyolefin-based resin having a weight average molecular weight of 20,000 or more can further improve the mechanical strength of the resulting polyolefin-based resin composition. The polyolefin-based resin having a weight average molecular weight of 6,000,000 or less makes it easier to mold the resulting polyolefin-based resin composition. The weight average molecular weight is determined by measurement in accordance with the later-described method. The weight average molecular weight is a value determined by preparing a 0.5% by mass solution of a polyolefin-based resin in chloroform, conducting a measurement by high-performance liquid chromatography, and making a comparison with polystyrene having a known weight average molecular weight, which has been measured under the same conditions. The measurement conditions are as follows.

Column: GPC Column
(Trade name of Tosoh Corporation: TSK GEL Multipore $FH_{XL}$-M)
Column Temperature: 40° C.
Eluate: Chloroform
Flow Rate: 1 mL/min The fluidity of a resin is indicated by the melt flow rate (MFR, unit: g/10 minutes), which is measured in accordance with, for example, the procedure described in JIS K 7210: 1999. The polyolefin-based resin usable in the present invention preferably has a melt flow rate within the range of 0.5 to 100 (g/10 minutes), and more preferably 1 to 75 (g/10 minutes), which is measured at a temperature of 230° C. with a 2.16 kg load in accordance with the procedure. The polyolefin-based resin having an MFR of 0.5 or more provides a polyolefin-based resin composition having a not excessively low fluidity, which is therefore easy to mold by injection molding in a desirable manner. The polyolefin-based resin having an MFR of 100 or less can further improve the weatherability of the resulting polyolefin-based resin composition.

The aliphatic polycarbonate resin usable in the present invention is not particularly limited. Preferable examples include polymers obtained by a polymerization reaction of an alkylene oxide and carbon dioxide in the presence of a metal catalyst.

Examples of alkylene oxides include ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, cyclohexene oxide, styrene oxide, vinylcyclohexene oxide, 3-phenylpropylene oxide, 3,3,3-trifluoropropylene oxide, 3-naphthyl propylene oxide, 3-phenoxy propylene oxide, 3-naphthoxy propylene oxide, butadiene monoxide, 3-vinyloxy propylene oxide, and 3-trimethylsilyloxy propylene oxide. Of these alkylene oxides, from the standpoint of their high polymerization reactivity with carbon dioxide, ethylene oxide and propylene oxide are preferably used, and propylene oxide is more preferably used. These alkylene oxides can be used singly or in a combination of two or more. For example, the aliphatic polycarbonate resin obtained by using ethylene oxide alone is polyethylene carbonate, and the aliphatic polycarbonate resin obtained by using propylene oxide alone is polypropylene carbonate.

Examples of metal catalysts include aluminum catalysts and zinc catalysts. Of these, from the standpoint of their high polymerization reactivity in a polymerization reaction of an alkylene oxide and carbon dioxide, zinc catalysts are preferably used. Of zinc catalysts, organozinc catalysts are more preferably used.

Examples of organozinc catalysts include zinc acetate, diethylzinc, and dibutylzinc; and those obtained by reacting a zinc compound with a compound such as a primary amine, a divalent phenol, a divalent aromatic carboxylic acid, an aromatic hydroxylic acid, an aliphatic dicarboxylic acid, and an aliphatic monocarboxylic acid. Of these, an organozinc catalyst obtained by reacting a zinc compound with an aliphatic dicarboxylic acid and an aliphatic monocarboxylic acid is preferable because of its high polymerization activity.

The amount of the metal catalyst for use in the polymerization reaction is preferably 0.001 to 20 parts by mass, and more preferably 0.01 to 10 parts by mass, per 100 parts by mass of the alkylene oxide. The metal catalyst in an amount of 0.001 parts by mass or more preferably facilitates the polymerization reaction. The metal catalyst in an amount of 20 parts by mass or less produces favorable effects that match the amount of catalyst added.

The method of the polymerization reaction between an alkylene oxide and carbon dioxide in the presence of a metal catalyst is not particularly limited. Examples include a method comprising charging an autoclave with the above-described alkylene oxide and a metal catalyst, optionally with a reaction solvent, mixing them, and injecting carbon dioxide thereinto with pressure to allow a reaction.

The reaction solvent for optional use in the polymerization reaction is not particularly limited, and a variety of organic solvents can be used. Specific examples include aliphatic hydrocarbon-based solvents, such as pentane, hexane, octane, decane, and cyclohexane; aromatic hydrocarbon-based solvents, such as benzene, toluene, and xylene; halogenated hydrocarbon-based solvents, such as chloromethane, methylenedichloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; and carbonate-based solvents, such as dimethyl carbonate, diethyl carbonate, and propylene carbonate.

The amount of the reaction solvent is preferably 300 to 10,000 parts by mass per 100 parts by mass of an alkylene oxide, from the standpoint of achieving a smooth reaction.

The pressure of carbon dioxide for use in the polymerization reaction is not particularly limited, but is typically preferably 0.1 to 20 MPa, more preferably 0.1 to 10 MPa, and yet more preferably 0.1 to 5 MPa.

The temperature for the polymerization reaction is not particularly limited, but preferably 30 to 100° C., and more preferably 40 to 80° C. A polymerization reaction temperature of 30° C. or more enables the polymerization reaction to proceed in a short time. A polymerization reaction temperature of 100° C. or less can decrease the likelihood of a side reaction, and further increase the yield. The polymerization reaction time cannot be generalized because it depends on the polymerization reaction temperature, but is typically preferably 2 to 40 hours.

After completion of the polymerization reaction, the reaction product is separated by filtration or the like, optionally washed with a solvent or the like, and dried to obtain an aliphatic polycarbonate resin. In the present invention, a single aliphatic polycarbonate resin or a combination of two or more aliphatic polycarbonate resins can be used.

The aliphatic polycarbonate resin for use in the present invention preferably has a weight average molecular weight of 10,000 to 2,000,000, more preferably 20,000 to 1,000,000, and yet more preferably 20,000 to 750,000. The weight average molecular weight is a value determined by preparing a 0.5% by mass solution of an aliphatic polycarbonate resin in chloroform and measuring the weight average molecular weight in the same manner as in the aforementioned measurement of the weight average molecular weight of a polyolefin-based resin.

An aliphatic polycarbonate resin having a weight average molecular weight of less than 10,000 may decrease the mechanical strength of the resulting polyolefin-based resin composition. An aliphatic polycarbonate resin having a weight average molecular weight of 2,000,000 or less exhibits increased dispersibility in a polyolefin-based resin, and thus improves the weatherability of the resulting polyolefin-based resin composition.

In the polyolefin-based resin composition according to the present invention, the minimum amount of the aliphatic polycarbonate resin is 0.05 parts by mass, preferably 0.5 parts by mass, and more preferably 1 part by mass, per 100 parts by mass of a polyolefin-based resin. The maximum amount of the aliphatic polycarbonate resin is 10 parts by mass, preferably 7.5 parts by mass, and more preferably 5 parts by mass, per 100 parts by mass of a polyolefin-based resin. In particular, the aliphatic polycarbonate resin is present in an amount of 0.05 to 10 parts by mass, preferably 0.5 to 10 parts by mass, more preferably 0.5 to 7.5, and yet more preferably 1 to 5 parts by mass, per 100 parts by mass of a polyolefin-based resin.

The aliphatic polycarbonate resin in an amount of more than 10 parts by mass may decrease the mechanical strength of the polyolefin-based resin composition. The aliphatic polycarbonate resin in an amount of less than 0.05 parts by mass may decrease the elasticity of the polyolefin-based resin composition.

Preferable examples of acid modified polypropylenes for use in the present invention include polypropylenes that are graft-modified with, for example, a dicarboxylic acid, an anhydride thereof, or a derivative of an unsaturated carboxylic acid.

Examples of dicarboxylic acids include maleic acid, fumaric acid, and itaconic acid. Examples of anhydrides of dicarboxylic acids include maleic anhydride, fumaric anhydride, and itaconic anhydride. Examples of derivatives of unsaturated carboxylic acids include maleic acid monoethyl ester, maleic acid diethyl ester, fumaric acid monomethyl ester, fumaric acid dimethyl ester, itaconic acid monoethyl ester, itaconic acid diethyl ester, maleic acid monoamide, maleic acid diamide, fumaric acid monoamide, fumaric acid diamide, itaconic acid monoamide, and itaconic acid diamide. Of these, maleic acid modified polypropylene and maleic anhydride modified polypropylene are preferably used from the standpoint of their excellent plasticizing effect and ease of mold processing of the resulting polyolefin-based resin composition. Acid modified polypropylenes may be used singly or in a combination of two or more.

The molecular weight of an acid modified polypropylene is not particularly limited insofar as the advantageous effects of the present invention are not impaired. For example, an acid modified polypropylene preferably has a weight average molecular weight of 2,000 to 100,000, more preferably 5,000 to 100,000, and yet more preferably 10,000, to 50,000.

An acid modified polypropylene having a weight average molecular weight of 10,000 or more enables an aliphatic polycarbonate resin to disperse more homogeneously in the resulting polyolefin-based resin composition, thereby further desirably increasing the weatherability of the polyolefin-based resin composition. An acid modified polypropylene having a weight average molecular weight of 100,000 or less makes it easier to process the resulting polyolefin-based resin composition by molding.

The weight average molecular weight is a value determined by preparing a 0.5% by mass solution of an acid modified polypropylene in chloroform and measuring the weight average molecular weight in the same manner as in the aforementioned measurement of the weight average molecular weight of a polyolefin-based resin.

The acid modified polypropylene MFR (measured in accordance with the method described in JIS K 7210:1999) is within the range of 1 to 100 (g/10 minutes), and preferably 2 to 50 (g/10 minutes) at a temperature of 230° C. under a 2.16 kg load. An acid modified polypropylene having an MFR of 1 or more makes it easier to process the resulting polyolefin-based resin composition by molding. An acid modified polypropylene having an MFR of 100 or less enables an aliphatic polycarbonate resin to disperse more homogeneously in the resulting polyolefin-based resin composition, thereby further increasing the weatherability of the polyolefin-based resin composition.

In the polyolefin-based resin composition according to the present invention, the minimum amount of the acid modified polypropylene is 0.01 parts by mass, and preferably 0.1 parts by mass, per 100 parts by mass of a polyolefin-based resin. The maximum amount of the acid modified polypropylene is 2 parts by mass, and preferably 1.5 parts by mass, per 100 parts by mass of a polyolefin-based resin. In particular, the acid modified polypropylene is present in an amount of 0.01 to 2 parts by mass, preferably 0.1 to 2 parts by mass, and more preferably 0.1 to 1.5 parts by mass, per 100 parts by mass of a polyolefin-based resin.

The acid modified polypropylene in an amount of 2 parts by mass or less produces effects matched to the amount of acid modified polypropylene added, and this is therefore economical. The acid modified polypropylene in an amount of 0.01 parts by mass or more can further increase the elasticity of the polyolefin-based resin composition.

The method for producing the polyolefin-based resin composition according to the present invention is not particularly limited. Examples include: a method comprising mixing, in no particular order, a polyolefin-based resin, an aliphatic polycarbonate resin, and an acid modified polypropylene using a Henschel mixer, a ribbon blender, a blender, or the like, to form a homogeneous mixture, and melt-kneading the mixture; and a method comprising dissolving a polyolefin-based resin, an aliphatic polycarbonate resin, and an acid modified polypropylene in a solvent or the like, mixing them, and removing the solvent. Of these production methods, the method comprising melt-kneading a polyolefin-based resin, an aliphatic polycarbonate resin, and an acid modified polypropylene is preferably used from the standpoint of the simplicity of producing the composition as well as the capability of producing a homogeneous composition. For example, a method comprising melt-kneading an aliphatic polycarbonate resin and an acid modified polypropylene to obtain a mixture, adding a polyolefin-based resin to the mixture, and melt-kneading the resulting mixture is preferably used.

The method for melt-kneading a polyolefin-based resin, an aliphatic polycarbonate resin, and an acid modified polypropylene is not particularly limited. Examples include melt-kneading methods using a biaxial vent extruder, a Banbury mixer, a kneader, a roll kneader, or the like.

The shape of the polyolefin-based resin composition according to the present invention is not restricted, and any shape, such as a strand, a sheet, a flat plate, and a pellet formed by cutting a strand in a proper length, is applicable. In particular, a pellet of 2 to 50 mm in length is preferable in order to subject it to injection molding, which is an easy mold processing technique.

Insofar as the advantageous effects of the present invention are not impaired, the polyolefin-based resin composition according to the present invention may comprise other additives, for example, antioxidants; metal deactivators; thermal stabilizers; neutralizers; stabilizers such as ultraviolet absorbers; defoamers; flame retardants; flame retardant aids; dispersants; antistats; lubricants; anti-blocking agents such as silica; colorants such as dyes and pigments; rubber; plasticizers; plate-like or powdery inorganic compounds such as glass flakes, mica, glass powder, glass beads, talc, clay, alumina, carbon black, and wollastonite; whiskers; and the like. The amount of an additive is, for example, preferably 0.1 to 10 parts by mass, more preferably 0.3 to 5 parts by mass, and yet more preferably 0.5 to 3 parts by mass, per 100 parts by mass of a polyolefin-based resin composition.

The molded article according to the present invention is obtained from the polyolefin-based resin composition according to the present invention.

Examples of methods for obtaining the molded article include injection molding, compression molding, injection compression molding, gas-assisted injection molding, foam injection molding, inflation, T-die extrusion, calendaring, blow molding, vacuum molding, and pressure molding. When the molded article of the present invention is in the form of a film or sheet, such a molded article may constitute at least one layer of a multi-layered structure produced by inflation, T-die extrusion, or calendaring conducted additionally using different resins. Alternatively, the molded article may be formed as a multi-layered film or sheet by extrusion lamination, thermal lamination, dry lamination, or the like. The obtained film or sheet can be mono- or biaxially stretched for use by roll stretching, tenter stretching, tubular stretching, or the like. The molded article according to the present invention may be subjected to a surface treatment, such as corona discharge treatment, flame treatment, plasma treatment, and ozone treatment.

The molded article of the present invention can be used as electrical and electronic components, building components, auto parts, machine components, daily commodities, industrial materials, and the like. Specific examples of electrical and electronic components include housings and internal parts of photocopy machines, personal computers, printers, electronic musical instruments, home-use game consoles, and portable game players. Specific examples of building components include curtain parts, blind parts, roof panels, thermal insulation walls, adjusters, floor posts, and ceiling hoisting attachments. Specific examples of auto parts include fenders, over fenders, grille guards, cowl louvers, wheel caps, side protectors, side moldings, side lower skirts, front grilles, roof rails, rear spoilers, bumpers, lower instrument panels, and trims. Specific examples of machine components include gears, screws, springs, bearings, levers, cams, ratchets, and rollers. Specific examples of daily commodities include cutlery, toiletry products, carton boxes, packaging films, wrapping films, laminated paper bags, prepaid cards, blades for cling films, food trays, garbage bags, laminated bags, pouches, labels, thermoformed items, packing bands, woven or knitted goods (garments, interior accessories), carpets, hygienic materials, packaging films, containers, and cups for food. Specific examples of industrial materials include textile binders, paper coating, adhesives, agricultural films, spun yarn, slit yarn, ropes, nets, filters, woven or knitted goods (industrial materials), compost bags, waterproof sheets, and sandbags.

The mechanism for how the present invention can provide a polyolefin-based resin composition having excellent mechanical strength and elasticity remains to be elucidated. While not wishing to be bound by any theory, we believe that the aliphatic polycarbonate resin disperses into the amorphous regions of the polyolefin-based resin via the acid modified polypropylene without affecting the crystalline form, crystallinity, and crystalline morphology (size of spherulites) of the polyolefin-based resin, which helps to maintain the mechanical strength and suppress the interfacial debonding between the polyolefin-based resin and the aliphatic polycarbonate resin during extension and contraction, thereby giving a polyolefin-based resin composition having both mechanical strength and elasticity.

The scope of the present invention encompasses an elasticity improving agent for a polyolefin-based resin, comprising an aliphatic polycarbonate resin and an acid modified polypropylene. The aliphatic polycarbonate resin and the acid modified polypropylene usable for the elasticity improving agent are the same as those usable for the polyolefin-based resin composition according to the present invention. The polyolefin-based resin to which the elasticity improving agent is applied is also the same as those usable for the polyolefin-based resin composition according to the present invention.

The elasticity improving agent preferably comprises 0.01 to 2 parts by mass of an acid modified polypropylene per 0.05 to 10 parts by mass of an aliphatic polycarbonate resin. More specifically, the elasticity improving agent comprises, per 5 parts by mass of an aliphatic polycarbonate resin, preferably 0.05 to 10 parts by mass, more preferably 0.1 to 5 parts by mass, and yet more preferably 0.2 to 2 parts by mass of an acid modified polypropylene.

The elasticity improving agent can be produced by various methods, such as a method comprising mixing an aliphatic polycarbonate resin and an acid modified polypropylene using a Henschel mixer, a ribbon blender, a blender, or the like to produce a homogeneous mixture, and a method comprising, in addition to the steps of the former method, melt-kneading the mixture.

The elasticity improving agent, when added to a polyolefin-based resin, improves the elasticity of the polyolefin-based resin while maintaining the mechanical strength. In other words, the elasticity improving agent can provide a polyolefin-based resin composition maintaining the mechanical strength of a polyolefin-based resin while exhibiting improved elasticity. For example, the elasticity improving agent is preferably added in an amount of 1 to 20 parts by mass, and more preferably 2 to 10 parts by mass, per 100 parts by mass of a polyolefin-based resin. Specific examples of the methods for adding the elasticity improving agent to a polyolefin-based resin include melt-kneading. The melt-kneading method is not particularly limited, but examples include a melt-kneading method using a biaxial vent extruder, a Banbury mixer, a kneader, a roll kneader, or the like.

The scope of the present invention encompasses an aid for improving the elasticity of a polyolefin-based resin with the aid comprising an aliphatic polycarbonate resin and being for use in combination with an acid modified polypropylene.

The aid for improving elasticity, when used in combination with an acid modified polypropylene and added to a polyolefin-based resin, improves the elasticity of the polyolefin-based resin while maintaining the mechanical strength. The aid can also be used in the production of the aforementioned elasticity improving agent. The aliphatic polycarbonate resin used in the aid for improving elasticity, the acid modified polypropylene used in combination with the aid, the polyolefin-based resin to which the aid is applied, the ratio of the acid modified polypropylene to the aliphatic polycarbonate resin contained in the aid, the method for combining the acid modified polypropylene with the aliphatic polycarbonate resin-containing aid, the ratio of the aliphatic polycarbonate resin contained in the aid to the polyolefin-based resin, the method for applying the aliphatic polycarbonate resin-containing aid to the polyolefin-based resin, and the like are the same as those described for the polyolefin-based resin composition according to the present invention and the elasticity improving agent for a polyolefin-based resin according to the present invention.

The scope of the present invention also encompasses a method for improving the elasticity of a polyolefin-based resin by adding the above-described elasticity improving agent for a polyolefin-based resin to a polyolefin-based resin, and a method for producing the above-described elasticity improving agent by adding the above-described aid for improving the elasticity of a polyolefin-based resin to be used in combination with an acid modified polypropylene to an acid modified polypropylene. The polyolefin-based resin and acid modified polypropylene used in these methods, the amount of the elasticity improving agent, the amount of the aid for improving elasticity, the method for adding the elasticity improving agent, and the method for adding the aid for improving elasticity are the same as those described for the polyolefin-based resin composition according to the present invention and the elasticity improving agent for a polyolefin-based resin according to the present invention.

EXAMPLES

The following Production Examples, Examples, and Comparative Examples describe the present invention in detail. However, the present invention is not limited to these Examples.

Evaluation

The measurement of the weight average molecular weight of the aliphatic polycarbonate resin obtained in the Production Example, the differential scanning calorimetry (DSC Measurement) and the measurement of small-angle X-ray scattering (SAXS Measurement) of the polyolefin-based resin compositions obtained in the Examples and Comparative Examples, and a uniaxial tensile test for the polyolefin-based resin compositions were conducted in accordance with the following procedure.

(1) Measurement of Weight Average Molecular Weight (Mw)

A 0.5% by mass solution of a resin to be measured in chloroform was prepared, and measurement was conducted by high-performance liquid chromatography. Comparison was made with polystyrene having a known weight average molecular weight, which was measured under the same conditions, and the molecular weight was determined. The number average molecular weight (Mn) was also determined in the same manner, and the molecular weight distribution (Mw/Mn) was determined. The measurement conditions are described below.

Measuring Instrument: HLC-8020 (manufactured by Tosoh Corporation)
Column: GPC Column
(Trade Name of Tosoh Corporation, TSK GEL Multipore $H_{XL}$-M)
Column Temperature: 40° C.
Eluate: Chloroform
Flow Rate: 1 mL/min (2) Differential Scanning Calorimetry (DSC Measurement)

The crystallization temperature and melting temperature of the polyolefin-based resin compositions were measured using the following instruments.

Measuring Instrument: Diamond DSC manufactured by PerkinElmer Inc.
Temperature Rising Rate: 20° C./min
Temperature Falling Rate: 20° C./min
Measuring Temperature Range: 0 to 230° C.

(3) Measurement of Small-Angle X-ray Scattering (SAXS Measurement)

The crystalline morphology of each polyolefin-based resin composition was observed using the following instrument.

Measuring Instrument: NANO-Viewer System manufactured by Rigaku Corporation
X-ray: CuK α ray (λ=0.154 nm)

(4) Hot-Press Molding

Test specimens for use in a tensile test were prepared by hot-press molding.

Instrument: Desktop Hot Press manufactured by Techno Supply
Press Temperature: 230° C.
Pressure: 20 MPa (5) Tensile Test The yield stress, necking stress, breaking stress, and breaking strain were measured using the following test specimens and instrument in accordance with JIS K 7161:1994. A test specimen having a higher yield stress and necking stress is considered to be a hard material with excellent strength. A test specimen having a higher breaking stress and breaking strain is considered to be a resilient material with excellent elasticity. The necking stress refers to a stress value observed while necking occurs in the measured test specimen. The "yield stress," "breaking stress," and "breaking strain" as used herein, respectively, correspond to the "tensile yield stress," "tensile stress at break," and "tensile strain at break" in JIS K 7161:1994.

Test specimens: Dumbbell Shape (Dimension of Neck Part: 10 mm in length, 4 mm in width, and 0.2 mm in thickness) (dumbbell shape)
Measuring Instrument: MODEL 4466, Tensile Testing Machine manufactured by Instron
Tension Rates: 40, 80, 120 mm/min
Measurement Temperature: 25° C.

Production Example 1: Production of Organozinc Catalyst

A 300-mL four-necked flask equipped with a stirrer, a nitrogen gas feeding tube, a thermometer, and a reflux condenser was charged with 8.1 g (100 mmol) of zinc oxide, 12.7 g (96 mmol) of glutaric acid, 0.1 g (2 mmol) of acetic acid, and 130 g (150 mL) of toluene. Subsequently, the atmosphere of the reaction system was replaced by a nitrogen atmosphere, and the temperature was raised to 55° C., followed by stirring at the same temperature for four hours to allow a reaction. The temperature was then raised to 110° C., and the mixture was stirred at the same temperature for four hours to allow azeotropic dehydration to remove only water. The reaction mixture was then cooled to room temperature, thereby giving a reaction liquid containing an organozinc catalyst.

A portion of the reaction liquid was separated and filtered to obtain an organozinc catalyst. The organozinc catalyst was analyzed by IR spectroscopy using an instrument manufactured by Thermo Nicolet Japan Inc. (trade name: Avatar 360). The results showed no peak of carboxy group.

Production Example 2: Production of Polypropylene Carbonate

The atmosphere of a 1-L autoclave equipped with a stirrer, a gas feeding tube, and a thermometer was replaced by a nitrogen atmosphere in advance, and the autoclave was charged with 8.0 mL of the reaction liquid containing an organozinc catalyst obtained in Production Example 1 (1.0 g of an organozinc catalyst was contained), 131 g (200 mL) of hexane, and 46.5 g (0.80 mole) of propylene oxide. Subsequently, carbon dioxide was added thereto while stirring to replace the atmosphere of the reaction system by a carbon dioxide atmosphere. Carbon dioxide was added until the pressure of the reaction system reached 1.5 MPa. The temperature was then raised to 60° C., and a polymerization reaction was allowed to proceed for 6 hours while carbon dioxide was being fed to the reaction system to compensate for the carbon dioxide consumed by the reaction.

After completion of the reaction, the autoclave was cooled and depressurized, and the reaction mixture was filtered, thereby giving 80.8 g of polypropylene carbonate. The obtained polypropylene carbonate had a weight average molecular weight of 336,000 (Mw/Mn=9.02).

Example 1

In accordance with the formulation shown in Measurement Example 1 of Table 1, 0.62 parts by mass of maleic acid modified polypropylene (acid modified PP, manufactured by Mitsui Chemicals, Inc., trade name: Admer QE800, MFR=9.1 g/10 min), and 3.11 parts by mass of the polypropylene carbonate (PPC) obtained in Production Example 2 were kneaded using a kneader (Micro 15 cc Twin Screw Compounder manufactured by DSM) at a preset temperature of 160° C. and a rotation speed of 50 rpm for 15 minutes to obtain a molten mixture. The mixture was molded by hot pressing, thereby giving pellets.

Subsequently, 3.73 parts by mass of the obtained pellets and 100 parts by mass of polypropylene (PP) (manufactured by Japan Polypropylene Corporation, Mw=380,000, Mw/Mn=4.9) were kneaded at a preset temperature of 180° C. and a rotation speed of 50 rpm for 3 minutes to obtain a molten mixture. The mixture was molded by hot pressing, thereby preparing test specimens for the tensile test.

Comparative Example 1

The procedure of Example 1 was repeated using only polypropylene, without using the pellets obtained by melt-kneading maleic acid modified polypropylene and polypropylene carbonate, thereby preparing test specimens.

Measurement Example 1

The test specimen obtained in Example 1 was measured for crystallization temperature, melting temperature, and crystallized form. In accordance with the procedure described in Evaluation (5) above, a tensile test was conducted at a tension rate of 120 mm/min using the test specimen, and the yield stress, necking stress, breaking stress, and breaking strain were measured. Table 1 shows the results. FIG. 1 shows the results of a small-angle X-ray scattering measurement conducted in accordance with the procedure described in Evaluation (3) above.

Comparative Measurement Example 1

The test specimen obtained in Comparative Example 1 was measured for crystallization temperature, melting temperature, and crystallized form. A tensile test was also conducted in the same manner as in Measurement Example 1, and the physical properties were measured. Table 1 shows the results. FIG. 1 shows the results of a small-angle X-ray scattering measurement conducted in the same manner as in Measurement Example 1.

Measurement Example 2

A tensile test was conducted using the test specimen obtained in Example 1 in the same manner as in Measurement Example 1 except that the tension rate was 80 mm/min in place of 120 mm/min to thereby measure the physical properties. Table 1 shows the results.

Comparative Measurement Example 2

A tensile test was conducted using the test specimen obtained in Comparative Example 1 in the same manner as in Measurement Example 1 except that the tension rate was 80 mm/min in place of 120 mm/min to thereby measure the physical properties. Table 1 shows the results.

Measurement Example 3

A tensile test was conducted using the test specimen obtained in Example 1 in the same manner as in Measurement Example 1 except that the tension rate was 40 mm/min in place of 120 mm/min to thereby measure the physical properties. Table 1 shows the results.

Comparative Measurement Example 3

A tensile test was conducted using the test specimen obtained in Comparative Example 1 in the same manner as in Measurement Example 1 except that the tension rate was 40 mm/min in place of 120 mm/min to thereby measure the physical properties. Table 1 shows the results.

TABLE 1

| | Tension Rate (mm/min) | Formulation (Parts by Mass) | | | Differential Scanning Calorimetry | | Tensile Test | | | |
|---|---|---|---|---|---|---|---|---|---|---|
| | | PP | PPC | Acid Modified PP | Crystallization Temperature (°C.) | Melting Temperature (°C.) | Yield Stress (MPa) | Necking Stress (MPa) | Breaking Stress (MPa) | Breaking Strain |
| Measurement Example 1 | 120 | 100 | 3.11 | 0.62 | 115 | 164 | 37 | 24.4 | 44.7 | 9.4 |
| Comparative Measurement Example 1 | 120 | 100 | — | — | 114 | 164 | 38.3 | 24.8 | 38.7 | 6.7 |
| Measurement Example 2 | 80 | 100 | 3.11 | 0.62 | — | — | 38.3 | 26.1 | 48.5 | 10.5 |
| Comparative Measurement Example 2 | 80 | 100 | — | — | — | — | 37.4 | 25.2 | 43.8 | 8.9 |
| Measurement Example 3 | 40 | 100 | 3.11 | 0.62 | — | — | 37.5 | 28.2 | 48.3 | 11 |
| Comparative Measurement Example 3 | 40 | 100 | — | — | — | — | 36.6 | 28.5 | 46.1 | 10 |

Comparative Example 2

A test specimen for a tensile test was prepared in the same manner as in Example 1 except that 0.62 parts by mass of a graft copolymer compatibilizer (trade name: Modiper A4300 manufactured by NOF Corporation, a graft copolymer having as a main chain a polymer subchain consisting of ethylene-derived monomer units and glycidyl methacrylate-derived monomer units (glycidyl methacrylate content: 15 wt %) and as a side chain a polymer subchain consisting of n-butyl acrylate-derived monomer units and methyl methacrylate-derived monomer units (methyl methacrylate content: 30 wt %), the side chain is present in an amount of 30 wt %, [η]=0.76 dl/g) was used in place of 0.62 parts by mass of maleic acid modified polypropylene.

Comparative Measurement Example 4

A tensile test was conducted using the test specimen obtained in Comparative Example 2 in the same manner as in Measurement Example 1 to measure the physical properties. However, the test specimen was torn apart during measurement, and the physical properties could not be measured.

As shown in Table 1, Example 1 and Comparative Example 1 revealed that there was no change in the crystallization temperature and the melting temperature of the polyolefin-based resin composition according to the present invention. The measurement results of small-angle X-ray scattering shown in FIG. 1 revealed that the pattern of the polyolefin-based resin composition is the same as that of polypropylene. These results indicate that the aliphatic polycarbonate resin and the acid modified polypropylene had no influence on the crystalline form, crystallinity, and crystalline morphology (size of spherulites) of the polyolefin-based resin.

The results of the tensile test shown in Table 1 revealed that the polyolefin-based resin composition according to the present invention is excellent in mechanical strength and elasticity. In particular, the polyolefin-based resin composition according to the present invention has mechanical strength equivalent to or higher than that of polypropylene, while exhibiting significantly higher elasticity than polypropylene. This was more noticeable as the tension rate became higher.

The invention claimed is:

1. A polyolefin-based resin composition comprising: a polyolefin-based resin, an aliphatic polycarbonate resin, and an acid modified polypropylene,
wherein, per 100 parts by mass of the polyolefin-based resin, 0.5 to 5 parts by mass of the aliphatic polycarbonate resin and 0.01 to 2 parts by mass of the acid modified polypropylene are present.

2. The polyolefin-based resin composition according to claim 1, wherein the polyolefin-based resin is polypropylene.

3. The polyolefin-based resin composition according to claim 1, wherein the aliphatic polycarbonate resin is a polymer obtained by polymerizing carbon dioxide and an alkylene oxide in the presence of a metal catalyst.

4. The polyolefin-based resin composition according to claim 1, wherein the aliphatic polycarbonate resin is polypropylene carbonate.

5. The polyolefin-based resin composition according to claim 1, wherein the acid modified polypropylene is maleic acid modified polypropylene or maleic anhydride modified polypropylene.

6. A molded article obtained from the polyolefin-based composition according to claim 1.

7. A method for improving the elasticity of a polyolefin-based resin, the method comprising:
melt-kneading a polyolefin-based resin, an aliphatic polycarbonate resin, and an acid modified polypropylene,
wherein, per 100 parts by mass of the polyolefin-based resin, 0.5 to 5 parts by mass of the aliphatic polycarbonate resin and 0.01 to 2 parts by mass of the acid modified polypropylene are used in the melt-kneading step.

8. The method for improving the elasticity of a polyolefin-based resin according to claim 7, wherein the polyolefin-based resin is polypropylene.

9. The method for improving the elasticity of a polyolefin-based resin according to claim 7, wherein the aliphatic polycarbonate resin is a polymer obtained by polymerizing carbon dioxide and an alkylene oxide in the presence of a metal catalyst.

10. The method for improving the elasticity of a polyolefin-based resin according to claim 7, wherein the aliphatic polycarbonate resin is polypropylene carbonate.

11. The method for improving the elasticity of a polyolefin-based resin according to claim 7, wherein the acid modified polypropylene is maleic acid modified polypropylene or maleic anhydride modified polypropylene.

* * * * *